US009596309B2

(12) United States Patent
Ensor et al.

(10) Patent No.: US 9,596,309 B2
(45) Date of Patent: Mar. 14, 2017

(54) METHOD AND APPARATUS FOR PARAMETERIZED PROMOTION AND DELIVERY OF DATA

(75) Inventors: James Robert Ensor, Red Bank, NJ (US); Jairo Orlando Esteban, Freehold, NJ (US); Volker Fredrich Hilt, Middletown, NJ (US); Markus Andreas Hofmann, Fair Haven, NJ (US); Ivica Rimac, Tinton Falls, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1717 days.

(21) Appl. No.: 12/203,582

(22) Filed: Sep. 3, 2008

(65) Prior Publication Data

US 2010/0057748 A1    Mar. 4, 2010

(51) Int. Cl.
G06F 15/167 (2006.01)
H04L 29/08 (2006.01)

(52) U.S. Cl.
CPC .......... *H04L 67/22* (2013.01); *H04L 67/2814* (2013.01); *H04L 67/2819* (2013.01)

(58) Field of Classification Search
CPC .. H04L 67/22; H04L 67/2819; H04L 67/2814

USPC ........................................................ 709/213
See application file for complete search history.

(56) References Cited

U.S. PATENT DOCUMENTS

| 7,069,325 | B1 * | 6/2006 | Lu et al. ...................... 709/226 |
| 7,085,893 | B2 * | 8/2006 | Krissell et al. .............. 711/133 |
| 7,257,386 | B1 * | 8/2007 | McDonnell et al. ......... 455/403 |
| 2002/0112069 | A1 * | 8/2002 | Sim ............................... 709/236 |
| 2008/0059631 | A1 * | 3/2008 | Bergstrom et al. .......... 709/224 |
| 2008/0091555 | A1 * | 4/2008 | Heather et al. ................ 705/26 |
| 2010/0312861 | A1 * | 12/2010 | Kolhi et al. .................. 709/219 |

* cited by examiner

*Primary Examiner* — Viet Vu
*Assistant Examiner* — Herman Belcher
(74) *Attorney, Agent, or Firm* — Tong, Rea, Bentley & Kim, LLC (57) ABSTRACT

The invention includes a method and apparatus for promoting a data item within a data distribution network. In one embodiment, a method includes monitoring at least one parameter for the data item where the data item is associated with an application or service, propagating the data item from a first data server toward a second data server based on the monitoring of the at least one parameter for the data item, and propagating, toward at least one device, a message indicative of the propagation of the data item from the first data server toward the second data server. The message is for adapting the at least one device to identify the second data server as a source of the data item capable of serving future requests for the data item.

20 Claims, 6 Drawing Sheets

METHOD AND APPARATUS FOR PARAMETERIZED PROMOTION AND DELIVERY OF DATA

FIELD OF THE INVENTION

The invention relates to the field of communication networks and, more specifically, content distribution networks.

BACKGROUND OF THE INVENTION

As generation of content by end users continues to become easier and more widespread, and, similarly, consumption of such end user content also continues to become easier and more widespread, communications service providers are under increasing pressure to support distribution of larger quantities of user generated content to large numbers of end users. In existing networks, the distribution of user generated content to end users is performed using Content Distribution Networks (CDNs) and/or Peer-to-Peer (P2P) Distribution Networks (PDNs).

CDNs are typically designed to distribute data from a small number of content origination points to a large number of content destination points, such that content is distributed from a small number of content sources to a large number of content consumers. Disadvantageously, however, CDNs are not suited to distribution of user generated content because user generated content originates from a large number of content origination points (i.e., the user terminals of the end users that are creating the user generated content) rather than from a few content origination points.

PDNs are typically designed to deliver data from a large number of data caches to a large number of data consumers. In many cases, the data is initially distributed to the data caches from a small number of centralized data stores. In PDNs, the data caches are also data consumers and, thus, the P2P algorithms must treat the data caches as unmanaged and unreliable. That is, PDNs do not act as stewards of the memory or network connection resources of the data sources.

In some cases, hybrid CDN-PDN networks are in use. Similar to the CDNs and PDNs, hybrid CDN-PDN networks are designed to ingest data from a small number of data sources and distribute the data to a large number of data consumers. Hybrid CDN-PDN networks initially receive data from managed, reliable content caches, using such managed, reliable content caches in conjunction with end user caches to distribute data to data consumers.

SUMMARY OF THE INVENTION

Various deficiencies in the prior art are addressed through a method and apparatus for promoting a data item within a data distribution network.

In one embodiment, a method includes monitoring at least one parameter for the data item where the data item is associated with an application or service, propagating the data item from a first data server toward a second data server based on the monitoring of the at least one parameter for the data item, and propagating, toward at least one device, a message indicative of the propagation of the data item from the first data server toward the second data server. The message is for adapting the at least one device to identify the second data server as a source of the data item capable of serving future requests for the data item.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides parameterized distribution of data using parameterized data distribution functions, including parameterized promotion of the data and parameterized delivery of the data. The parameterized data distribution functions provide a data distribution system that enables ingestion of data at a large number of distributed sites and consumption of data at a large number of distributed sites. The parameterized data distribution functions provide localization of network traffic required for distribution of data to end users. The parameterized data distribution functions enable dynamic promotion of data to other storage sites as needed. The parameterized data distribution functions may be used for distribution of any type of data, although the parameterized data distribution functions may be particularly well-suited for distribution of user-generated content, which is naturally ingested at the many sites of content production and often consumed at a large number of distributed sites.

Figure 1:
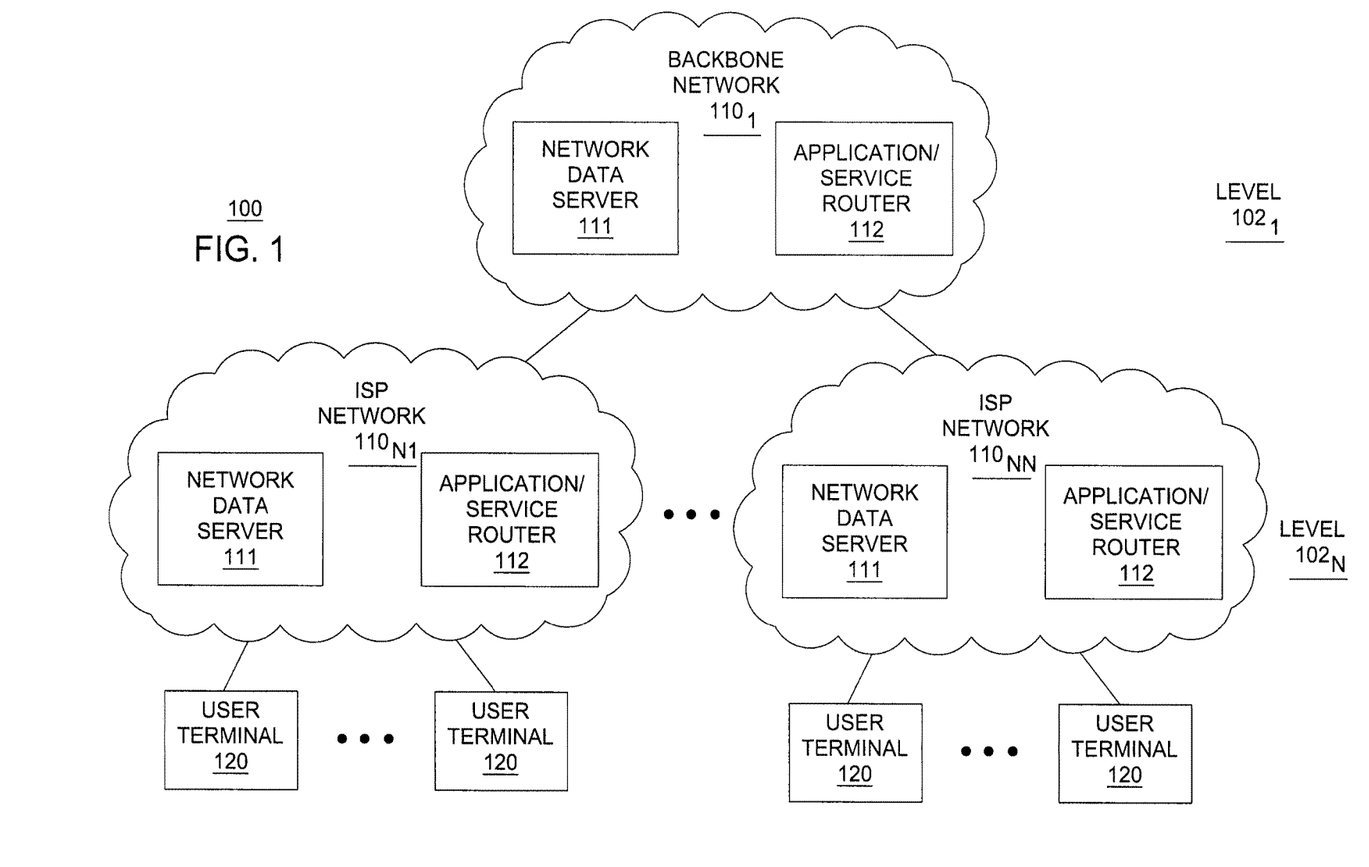
FIG. 1 depicts a high-level block diagram of a communication network.

FIG. 1 depicts a high-level block diagram of a communication network. Specifically, communication network 100 operates as a data distribution network that is adapted to support data ingestion at a large number of user terminals and to support data consumption at a large number of user terminals. The data distribution network 100 includes a plurality of networks 110 (collectively, networks 110) arranged hierarchically using a plurality of hierarchical network levels $102_1$-$102_N$ (collectively, hierarchical network levels 102). As depicted in FIG. 1, the networks 110 serve a plurality of user terminals 120 (collectively, user terminals 120).

As depicted in FIG. 1, each hierarchical network level 102 includes at least one network 110. For example, hierarchical network level $102_1$ includes one network $110_1$ (e.g., a backbone network that is adapted for serving each of the hierarchical network levels 102 lower in the hierarchy of network levels). For example, hierarchical network level $102_N$ includes a plurality of networks $110_{N1}$-$110_{NN}$ (e.g., a plurality of Internet Service Provider (ISP) networks, campus networks, local area networks, and the like) adapted for serving other hierarchical network levels lower in the hierarchy (not depicted) and user terminals 120.

Although primarily depicted and described herein with respect to use of the present invention with specific numbers and configurations of hierarchical network levels 102, the present invention may be used with other numbers and/or configurations of hierarchical network levels 102 (or even in networks without such defined hierarchical network levels). Similarly, although primarily depicted and described herein with respect to use of the present invention with specific numbers, configurations, and types of networks 110, the present invention may be used with other numbers and/or configurations and/or types of networks 110 (e.g., in fully meshed networks, combined hierarchy/cross-connect networks, and the like).

As depicted in FIG. 1, each network 110 includes a network data server 111, respectively. The network data servers 111 store data items and serve requests for data items as the data item requests are received from user terminals 120. A network data server 111 may propagate data items to one or more of the other network data server 111 for storage on the one or more other network data servers 111 using the parameterized data promotion functions of the present invention. The network data servers 111 support parameterized data delivery functions of the present invention. The network data servers 111 may perform various other functions described herein.

The user terminals 120 may operate as sources and/or consumers of data items. A user terminal 120 may propagate data items to one or more network data servers 111 for storage on the one or more network data servers 111 using parameterized data promotion functions of the present invention. The user terminals 120 may operate as servers of data items, supporting parameterized data delivery functions of the present invention by serving requests for data items received from others of the user terminals 120. For example, user terminals 120 may include computers, mobile phones, personal data assistants, and the like.

The network data servers 111 and user terminals 120 may be referred to herein as data servers since each is capable of serving requests for data items.

As depicted in FIG. 1, each network 110 includes application/service router(s) 112, respectively.

The application/service routers 112 are adapted to receive data item requests from user terminals 120, select the data server to which the data item request should be forwarded (e.g., one of the network data servers 111 or one of the user terminals 120), and forward the data item request for delivery to the data server selected to serve the data item request. The application/service routers 112 may each be adapted to support one or more applications or services.

The application/service routers 112 may select the data server to which a data item request should be forwarded by determining which data server(s) are capable of serving the data item request and, where more than one data server is determined to be capable of serving the data item request, selecting which of the data servers to which the data item request should be forwarded (e.g., selecting the data server best suited to serve the data item request).

The application/service routers 112 may determine which of the data servers is capable of serving the data item request in many ways.

In one embodiment, in which the data item request is a request for a data item that is stored on a particular data server (e.g., on a particular user terminal 120 or network data server 111), upon receiving a data item request the application/service router 112 inspects the data item request to determine the data server for which the data item request is intended. In this embodiment, the application/service router 112 may forward the data item request to the identified data server or, alternatively, may forward the data item request to another data server capable of serving the data item request (i.e., by selecting between multiple data servers determined to be capable of serving the data item request).

In one embodiment, upon receiving a data item request, the application/service router 112 inspects the data item request to determine the data item that is being requested. The application/service router 112 may determine the data item that is being requested from a data item identifier associated with the requested data item. The application/service router 112 then determines which data server(s) is capable of serving the data item request (e.g., by retrieving a list of data servers currently storing a copy of the requested data item). The application/service router 112 then selects one of the data servers determined to be capable of serving the data item request and forwards the data item request to the selected data server.

The application/service routers 112 may decide between multiple data servers capable of serving the data item request in many ways. In one embodiment, application/service routers 112 may select one of multiple data servers capable of serving the data item request by analyzing one or more parameters for the data item request, thereby providing parameterized data delivery functions of the present invention. As described herein, parameters(s) considered by application/service routers 112 in deciding between multiple data servers capable of serving a data item request may include one or more characteristics of the data item request, one or more characteristics of the network, one or more characteristics of each of the data servers capable of serving the data item request, and the like, as well as various combinations thereof.

The application/service routers 112 determine which data servers will serve received data item requests and, thus, each of the application/service routers 112 maintains a current view of which data items are available from which data servers (for at least a subset of the data items available in the network).

In one embodiment, in order for application/service routers 112 to maintain a current view of which data items are available from which data servers, each application/service router 112 which may receive a request for a given data item may be updated as that given data item is promoted between data servers. For example, where a video clip is promoted from a user terminal 120 to a network data server 111, each application/service router 112 capable of serving requests for that video clip is notified of the promotion of the video clip from the user terminal 120 to the network data server 111, such that each application/service router 112 that receives a request for that video clip is able to direct the request to the appropriate data server.

In one embodiment, a subset of the application/service routers 112 which may receive a request for a given data item may be updated as that given data item is promoted between data servers (i.e., rather than updating all of the application/service routers 112 which may receive a request for the given data item). This embodiment may be used, for example, where there is cooperation among the application/service routers 112, such that if one of the application/ service routers 112 that was not updated in response to promotion of a data item receives a request for the data item, that application/service router 112 may forward the data item request to an application/service router 112 that was updated in response to promotion of the data item.

In one embodiment, application/service routers 112 may be adapted to at least participate in (and, optionally, to control) the decision as to whether data items are promoted from source data servers to target data servers and, further, where a decision is made to promote a data item from a source data server to target data server(s), may participate in negotiations to determine whether or not the target data server(s) will accept promotion of the data item from the source data server.

Thus, as described herein, each of the application/service routers 112 is involved in both the parameterized data promotion and parameterized data delivery functions of the present invention.

The data items for which parameterized data promotion and data delivery functions may be supported may include any types of data items. For example, the data items may include content items, such as text items, audio items, image items, video items, multimedia items, and the like, as well as various combinations thereof. In one embodiment, the data items include user-generated content. The data items may include any other content items which may be distributed to user terminals 120. The data items will generally be associated with at least one application or service. The data items may be identified in many ways. For example, data items may be uniquely identified using a combination of the application/service with which the data item is associated and an identifier of that data item within that associated application/service, using a hash value over the data item name, and the like, as well as various combinations thereof.

The servers 111, user terminals 120, and application/service routers 112 (and, optionally, other network elements, such as data routers, traffic monitoring devices, and the like) cooperate to provide the parameterized data promotion functions and parameterized data delivery functions of the present invention.

The parameterized data promotion functions of the present invention enable determination of whether or not a data item should be promoted from a source data server to one or more target data servers such that requests for the data item may be served more efficiently.

The determination as to whether or not a data item should be promoted from a source data server to one or more target data servers may be performed by monitoring one or more parameters for the data item.

The parameter(s) monitored for determining whether a data item should be promoted may be monitored using any device or combination of devices capable of monitoring the parameter(s). For example, parameter(s) monitored for determining whether a data item should be promoted may be monitored by the current source(s) of the data item (e.g., user terminal(s) 120 and/or data servers 111), network devices responsible for routing requests for the data item to the current source(s) of the data item (e.g., application/service router(s) 112 and/or any other network elements that may route requests for the data item to the current source(s) of the data item), other devices which may have or may be capable of obtaining information which may be relevant to the determination as to whether a data item should be promoted, and the like, as well as various combinations thereof.

The parameter(s) monitored for determining whether a data item should be promoted may be monitored in any suitable manner (e.g., using thresholds, analyzing information associated with the parameter, and the like, as well as various combinations thereof, which may depend on the parameter being monitored).

The parameters considered in determining whether a data item should be promoted from a source data server to one or more target data servers may include: one or more characteristics of each of the data item requests associated with the data item, one or more characteristics of the source data server, one or more characteristics of each of the target data servers, one or more characteristics of one or more networks, and the like, as well as various combinations thereof. The parameters/information analyzed in determining whether or not a data item should be promoted from a source data server to one or more target data servers may include other parameters and/or information.

For example, the one or more characteristics of each of the data item requests associated with the data item may include the number of requests for the data item, the geographic locations from which the respective data item requests are received, the network locations from which the respective data item requests are received, a property of at least one network path to a requester of the data item (e.g., bandwidth, delay, path status, and/or any other similar properties), and the like, as well as various combinations thereof.

For example, the one or more characteristics of each of the source and target data servers may include geographic location, network location (e.g., the network(s) with which the data server is associated, such as being associated with a LAN, an ISP network, a backbone network, and the like), status of one or more resources of the source and/or target data servers (e.g., memory resources, network connection resources, and the like), and the like, as well as various combinations thereof.

For example, the one or more characteristics of one or more networks may include network routing information, network load information, and the like, as well as various combinations thereof.

In one embodiment, the device(s) responsible for monitoring a parameter(s) for a data item in order to determine whether a condition(s) associated with the parameter(s) has been satisfied and, when the condition(s) is satisfied, the source data server will propagate the data item to one or more target data servers (or may request to propagate the data item, where the target data server may have the option of refusing to accept the propagated data item).

The parameterized data promotion functions of the present invention enable determination of whether a data item should be promoted from a source data server to one or more target data servers and, further, where a determination is made that a data item should be promoted, parameterized data promotion functions of the present invention enable determination of the target data server(s) to which the data item should be promoted (and, where target data servers may refuse promotion of a data item, negotiations for determining whether or not the target data server(s) will accept the data item).

The selection of a target data server(s) to which the data item should be promoted may be based on the monitoring of the parameter(s) and/or using other information (e.g., such as information described herein as being capable of being used as parameters in determining whether or not to promote a data item, but which is not used in the decision as to whether the data item should be promoted). The selection of a target data server(s) may be performed by any device or combination of devices (e.g., one or more of user terminals, network data servers, application/service routers, other network elements, and the like, as well as various combinations thereof). The device(s) which select the target data server(s) may include all, some, or none of the devices which make the determination that the data item should be promoted.

The negotiations may be performed using any information. In one embodiment, for example, the negotiation may be based on information associated with the target data server(s) (e.g., information such as the total storage capacity of the target data server(s), the available storage capacity of the target data, and the like), information associated with the data item (e.g., the popularity of the data item, the importance of the data item to the target data server(s), and the like), and the like, as well as various combinations thereof. The negotiation may be performed between combination of devices. In one embodiment, for example, the negotiation may be performed between the source data server and the target data server(s) directly. In another embodiment, for example, the negotiations may be performed using one or more devices proxying on behalf of the source data server and/or using one or more devices proxying on behalf of the target data server(s). The device(s) proxying on behalf of the data servers may include application/service routers, other network devices, and the like, as well as various combinations thereof. In one embodiment, negotiation may be optional (e.g., where target data servers are not adapted to be able to refuse acceptance of a data item promoted from a source data server).

In one embodiment, where negotiations with an initially selected target data server do not result in promotion of the data item (e.g., the target data server ultimately refuses to accept the data item), the source data server may retain the data item, and no further attempts at promoting the data item will be performed at that time. In another embodiment, where negotiations with an initially selected target data server do not result in promotion of the data item (e.g., the target data server ultimately refuses to accept the data item), an attempt may be made to promote the data item to a different target data server(s). In this embodiment, the different target data server(s) may be pre-selected (e.g., from a prioritized list of data servers that is generated during or contemporaneously with the determination as to whether the data item should be promoted) or dynamically selected in response to the decision by the initial target data server(s) to refuse the data item.

The parameterized data promotion functions of the present invention enable promotion of the data item from the source data server to the target data server(s) that are selected (and, which may ultimately agree to accept the data item, where negotiations for such acceptance are performed). The data item may be propagated from the source data server to the target data server(s) in any manner (e.g., using any networks, protocols, and the like, as well as various combinations thereof).

The target data server(s) may be at a higher level of the network hierarchy (e.g., the data item is propagated from a user terminal to an ISP data server, from an ISP data server to a backbone data server, and the like), at the same level of the network hierarchy (e.g., the data item is propagated from a data server of one ISP to a data server of another ISP, from a data server of an ISP to a campus network of a college, and the like), and/or at a lower level of the network hierarchy (e.g., the data item is propagated from a backbone data server to an ISP data server, from an ISP data server to a data storage device on a local area network, and the like).

The source data server from which a data item is promoted may or may not continue to serve requests for the data item following promotion of the data item. In one embodiment, after promoting a data item to one or more other data servers, the data server that promoted the data item may retain a copy of the data item and, thus, may continue serving requests for the data item (i.e., where that data server is selected as the data server to distribute that data item in response to a request for the data item). In another embodiment, after promoting a data item to one or more other data servers, the data server that promoted the data item may quit serving requests for the data item (e.g., and, as such, may free up storage space by deleting all of the existing copies of the data item).

The source data server from which a data item is promoted may or may not continue to play a role in subsequent promotion of the data item following promotion of the data item from that source data server. In one embodiment, after promoting a data item to one or more other data servers, the data server that promoted the data item may retain at least some level of control over subsequent promotion of the data item (e.g., retaining exclusive control, or participating with other data servers and/or other network elements in cooperative control over subsequent decisions as to whether or not to promote the data item). In another embodiment, after promoting a data item to one or more other data servers, the data server that promoted the data item may relinquish all control over subsequent promotion of the data item.

As an example of parameterized data promotion, a user terminal may monitor the number of requests that are received for a data item with respect to a threshold number of data item requests (e.g., fifty) such that, when the fifty-first request for the data item is received at the user terminal, the user terminal propagates a copy of the data item to a server better suited for serving a larger number of requests (e.g., to network-based data server). In this example, the user terminal may propagate the data item to an ISP data server in the ISP network that is serving the user terminal. In continuation of this example, the user terminal may further monitor the network locations of the requests that are received for the data item (e.g., monitoring the ISP network from which each data item request originates) such that, if a large number of the data item requests are determined to be originating from another ISP network, the user terminal may propagate the data item to an ISP data server in another ISP network (i.e., to a data server within that the ISP network from which the data item requests are originating). In this example, where the user terminal is not capable of performing such monitoring, the monitoring may be performed by one or more network-based devices on behalf of the user terminal (e.g., by an application/service router(s) that is directing the requests for the data item to the user terminal and, thus, has information indicative of the number of requests for the data item).

As another example of parameterized data promotion, an ISP data server may have a threshold of ten thousand data item requests such that, when the threshold is satisfied at the ISP data server, the ISP data server propagates a copy of the data item to one or more servers better suited for serving a larger number of requests. In this example, the ISP data server may propagate the data item to one or more data storage devices higher in the network hierarchy (e.g., to a data storage device within the backbone network). In this example, the ISP data server may also (or alternatively) propagate the data item to one or more data storage devices at the same level or a lower level of the network hierarchy (e.g., when such promotion of the data item will improve one or more parameters, such as network load, response times, and the like). In continuation of this example, the data server may further monitor the network locations of the requests that are received for the data item (e.g., monitoring the network from which each data item request originates) such that, if a determination is made that a large percentage of the data item requests being received at the ISP data server are originating from the campus networks of two universities, the ISP data server may propagate the data item to data servers within the respective campus networks of those two universities, thereby enabling the data item requests that are originating from those campuses to be served locally and, thus, offloading the number of requests being served by the ISP data server that originally stored the data item. In this example, rather than the monitoring of the number of requests by the ISP data server, the monitoring may be performed by one or more other devices on behalf of the ISP data server (e.g., by a group of application/service routers that is directing the requests for the data item to the ISP data server and, thus, has information indicative of the number of requests for the data item).

In other words, although primarily described herein with respect to only a few relatively simple examples in which specific combinations of parameters formed the basis for controlling the promotion of data items, from these examples it is clear that parameterized promotion of data items may utilize many different combinations of parameters in a manner tending to improving many different aspects of data distribution (e.g., in a manner tending to improve resource utilization at user terminals and/or within the network, in a manner tending to improve data distribution response times, and the like, as well as various combinations thereof). Additionally, although primarily described herein with respect to only a few relatively simple examples in which only one device is responsible for determining when and how a data item should be promoted, it is clear that different devices and/or combinations of devices may control, or at least participate in, parameterized promotion of data items.

The parameterized data delivery functions of the present invention enable the application/service routers to determine which data server should serve a request for a data item. An application/service router, upon receiving a data item request from a user terminal, determines which data server should serve the request for the data item by analyzing one or more parameters for the data item request. An application/service router determining which data server should serve a data item request may analyze the parameter(s) in any manner (e.g., using thresholds, analyzing information associated with the parameter, and the like, as well as various combinations thereof, which may depend on the parameter being analyzed).

The parameters considered in selecting the data server from which a data item request should be served may include a list of data servers capable of serving the data item request (i.e., the list of data servers currently storing the requested data item), one or more characteristics of the data item request (e.g., the geographic location from which the data request was received, the network location from which the data request was received, one or more properties of the network path(s) which may be used to serve the data item request, and the like), one or more characteristics of the network (e.g., load, bandwidth, and the like), one or more characteristics of each of the data servers from which the data item request could be served (e.g., memory resources, network connection resources, and the like), and the like, as well as various combinations thereof.

As an example, an application/service router receiving a request for a data item may determine that the request is received from a user terminal that is located in New York. In this example, the application/service router may then determine that there are two data servers that are currently storing the requested data item (e.g., a data server located in New Jersey and a data server located in California). In this example, based on the geographic locations of the user terminal and the two data servers (and/or based on one or more properties of the network path(s) which may be used to serve the data item request), the application/service router may select the data server in New Jersey as the data server that should serve the data item request.

As another example, an application/service router receiving a request for a data item may determine that the request is received from a user terminal that is associated with a first ISP network. In this example, the application/service router may then determine that there are four data servers that are currently storing the requested data item (e.g., a user terminal that is associated with the first ISP, a data server associated with the first ISP, a data server associated with a second ISP, and a data server associated with a backbone network). In this example, based on the network locations of the user terminal and the four data servers, the application/service router may select the data server in first ISP network as the data server that should serve the data item request.

In other words, although primarily described herein with respect to only a few specific examples in which individual parameters formed the basis for controlling the delivery of data items, from these examples it is clear that parameterized delivery of data items may utilize many different combinations of parameters in a manner tending to improving many different aspects of data delivery (e.g., in a manner tending to improve resource utilization at user terminals and/or within the network, in a manner tending to improve data distribution response times, and the like, as well as various combinations thereof).

Figure 2:
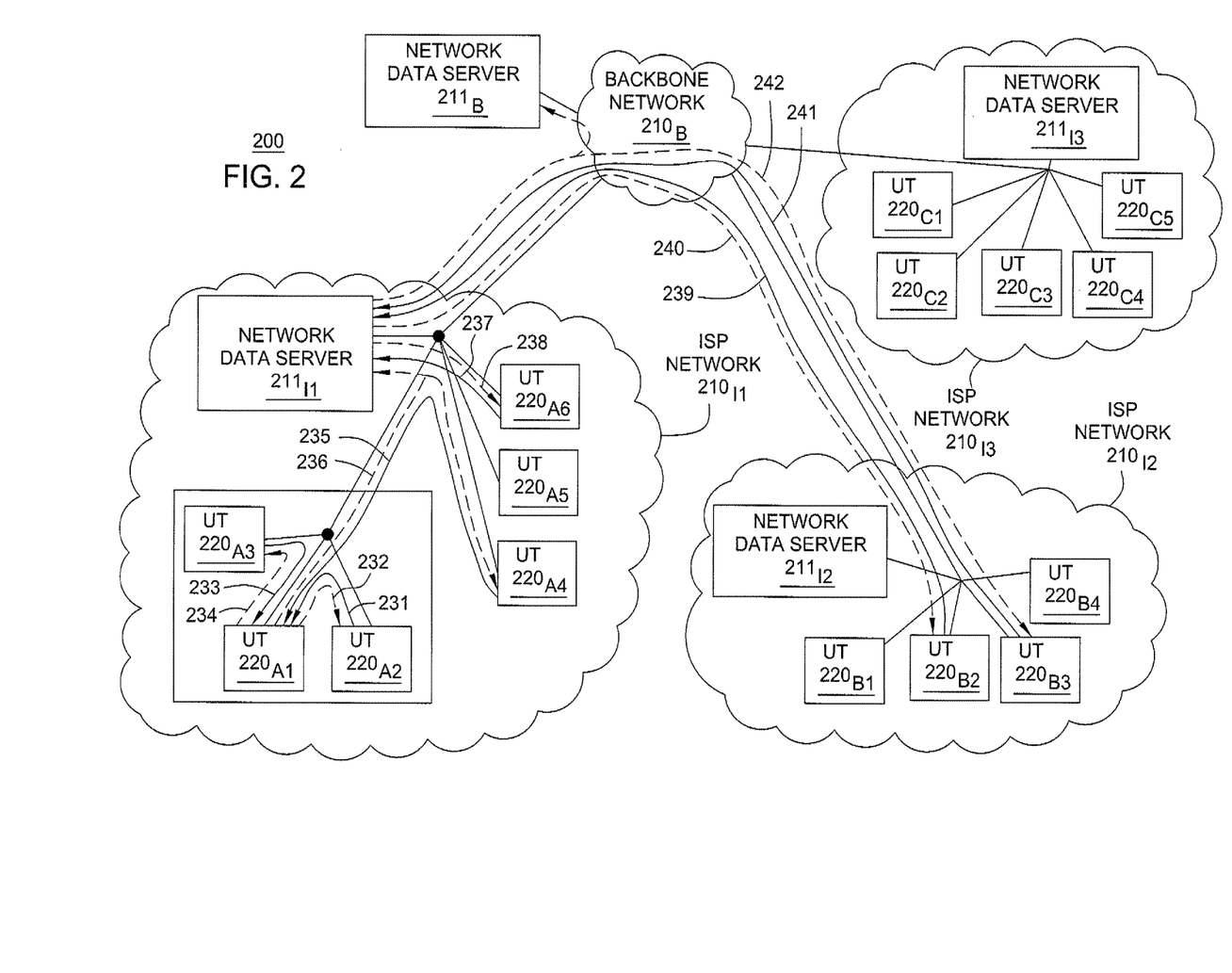
FIG. 2 depicts a high-level block diagram of a data distribution network, illustrating the parameterized data promotion and parameterized data delivery functions of the present invention for an exemplary data item.

The parameterized promotion of data items and parameterized delivery of data items may be better understood with respect to the example depicted and described herein in FIG. 2.

FIG. 2 depicts a high-level block diagram of a data distribution network, illustrating the parameterized data promotion and data delivery functions for a data item. The data distribution network 200 includes a backbone network $210_B$, a first ISP network $210_{I1}$, a second ISP network $210_{I2}$, and a third ISP network $210_{I3}$. The three ISP networks $210_{I1}$-$210_{I3}$ each communicate with backbone network $210_B$. The three ISP networks $210_{I1}$-$210_{I3}$ and backbone network $210_B$ may be collectively referred to as networks 210.

As depicted in FIG. 2, each network 210 includes a network data server. More specifically, backbone network $210_B$ includes a backbone network data server $211_B$, first ISP network $210_{I1}$ includes a first ISP network data server $211_{I1}$, second ISP network $210_{I2}$ includes a second ISP network data server $211_{I2}$, and third ISP network $210_{I3}$ includes a third ISP network data server $211_{I3}$. The three ISP network data servers $211_{I1}$-$211_{I3}$ and backbone network data server $211_B$ may be collectively referred to as network data servers 211.

As depicted in FIG. 2, each ISP network $210_I$ further includes a router (e.g., an application/service router). More specifically, first ISP network $210_{I1}$ includes a first application/service router $212_{I1}$, second ISP network $210_{I2}$ includes a second application/service router $212_{I2}$, and third ISP network $210_{I3}$ includes a third application/service router $212_{I3}$. The home also includes an application/service router $212_H$. The application/service routers $212_{I1}$-$212_{I3}$ and $212_H$ may be collectively referred to as application/service routers 212. The backbone network $210_B$ will also include application/service routers (although such routers have been omitted from FIG. 2 for purposes of clarity).

Although omitted from FIG. 2 for purposes of clarity, each of the ISP networks $210_I$ and backbone network $210_B$ will further include other network elements supporting communications between the various components of the different networks. For example, each of the ISP networks $210_I$ and backbone network $210_B$ may further include packet routers, switches, and like network elements adapted for supporting communications between ISP network data servers $211_{I1}$-$211_{I3}$, backbone network data server $211_B$, application/service routers $212_{I1}$-$212_{I3}$ and $212_H$, user terminals 220, and the like, as well as various combinations thereof.

As depicted in FIG. 2, each ISP network $210_{I1}$-$210_{I3}$ provides network access for a plurality of user terminals. More specifically, first ISP network $210_{I1}$ provides access for a plurality of user terminals $220_{A1}$-$220_{A6}$ (where user terminals $220_{A1}$-$220_{A3}$ are depicted as being located within the same house), second ISP network $210_{I2}$ provides access for a plurality of user terminals $220_{B1}$-$220_{B4}$, and third ISP network $210_{I3}$ provides access for a plurality of user terminals $220_{C1}$-$220_{C5}$. The user terminals $220_A$, $220_B$, and $220_C$ may be collectively referred to as user terminals 220.

In the example of FIG. 2, assume that a user has generated a content item at user terminal $220_{A1}$, and that the content item has been stored on a local memory of user terminal $220_{A1}$. In this example, further assume that each of the application/service routers $212_{I1}$-$212_{I3}$ and $212_H$ is associated with the same application or service, such that each of the application/service routers $212_{I1}$-$212_{I3}$ and $212_H$ is capable of serving requests for the content item of the example.

In this example, for purposes of clarity, assume that the source data server that is currently storing the data item has sufficient information to make a determination as to whether the data item should be promoted (although, in practice, the determination as to whether or not the data item should be promoted from a source data server to a target data server(s) may be performed by any device or combination of devices having information relevant to the determination as to whether or not the data item should be promoted, such as by multiple data servers, data servers in combination with application/service routers, multiple application/service routers operating collectively, one or more data servers and one or more application/service routers operating in conjunction with one or more other network elements, and the like).

In this example, for purposes of clarity, assume that when a decision is made to promote a content item, the content item is only promoted to one target data server (although, in practice, the content item may be promoted from one source data server to multiple different target data servers). In this example, for purposes of clarity, further assume that after a content item is promoted from a first data server to a second data server, the first data server does not retain a copy of content item (although, in practice, any number of data servers may retain copies of the content item such that intelligent decisions regarding delivery of the content item may be made). The example illustrating the delivery and promotion of the content item within the exemplary network of FIG. 2 follows.

At step 231, user terminal $220_{A2}$ sends a request for the content item. The request for the content item sent by user terminal $220_{A2}$ is received by application/service router $212_H$, which identifies user terminal $220_{A1}$ as the sole source of the requested content item and, thus, propagates the content item request to user terminal $220_{A1}$. At step 232, user terminal $220_{A1}$ responds to the request for the content item from user terminal $220_{A2}$ by retrieving a copy of the requested content item from its local memory and propagating the content item to user terminal $220_{A2}$ which requested the content item.

At step 233, user terminal $220_{A3}$ sends a request for the content item. The request for the content item sent by user terminal $220_{A3}$ is received by application/service router $212_H$, which identifies user terminal $220_{A1}$ as the sole source of the requested content item and, thus, propagates the content item request to user terminal $220_{A1}$. At step 234, user terminal $220_{A1}$ responds to the request for the content item from user terminal $220_{A3}$ by retrieving a copy of the requested content item from its local memory and propagating the content item to user terminal $220_{A3}$ which requested the content item.

At step 235, user terminal $220_{A4}$ sends a request for the content item. The request for the content item sent by user terminal $220_{A4}$ is received by application/service router $212_{I1}$, which identifies user terminal $220_{A1}$ as the sole source of the requested content item (because user terminal $220_{A1}$, and/or another device(s) responsible for monitoring the number of requests for the data item, has not yet decided that it is appropriate to promote storage of the content item) and, thus, propagates the content item request to user terminal $220_{A1}$. At step 236, user terminal $220_{A1}$ responds to the request for the content item from user terminal $220_{A4}$ by retrieving a copy of the requested content item from its local memory and propagating the content item to user terminal $220_{A4}$ which requested the content item. Additionally, at step 236, using the data promotion algorithm, the user terminal $220_{A1}$ (and/or another device(s) responsible for monitoring the number of requests for the data item) also decides to promote the content item. The user terminal $220_{A1}$ selects a data server to which the content item should be promoted. In this example, user terminal $220_{A1}$ selects first ISP network data server $211_{I1}$ as the data server to which the content item should be promoted (e.g., based on the increasing number of requests for the content item that are being received from other user terminals $220_A$ associated with the first ISP network $210_{I1}$). The user terminal $220_{A1}$ then sends a copy of the content item to first ISP network data server $211_{I1}$ (ignoring any negotiation which may be performed), which stores the content item. The user terminal $220_{A1}$ then notifies each of the application/service routers which are capable of serving requests for the content item that the content item is now available from first ISP network data server $211_{I1}$ (which, in this example, includes each of the application/service routers $212_{I2}$, $212_{I3}$, and $212_H$).

At step 237, user terminal $220_{A6}$ sends a request for the content item. The request for the content item sent by user terminal $220_{A6}$ is received by application/service router $212_{I1}$, which now identifies first ISP network data server $211_{I1}$ (rather than user terminal $220_{A1}$) as the sole source of the requested content item and, thus, propagates the content item request to first ISP network data server $211_{I1}$. At step 238, first ISP network data server $211_{I1}$ responds to the request for the content item from user terminal $220_{A6}$ by retrieving a copy of the requested content item from its local memory and propagating the content item to user terminal $220_{A5}$ which requested the content item.

At step 239, user terminal $220_{B2}$ sends a request for the content item. The request for the content item sent by user terminal $220_{B2}$ is received by application/service router $212_{I2}$, which identifies first ISP network data server $211_{I1}$ as the sole source of the requested content item and, thus, propagates the content item request to first ISP network data server $211_{I1}$ via backbone network $210_B$. At step 240, first ISP network data server $211_{I1}$ responds to the request for the content item from user terminal $220_{B2}$ by retrieving a copy of the requested content item from its local memory and propagating the content item to user terminal $220_{B2}$ which requested the content item.

At step 241, user terminal $220_{B3}$ sends a request for the content item. The request for the content item sent by user terminal $220_{B3}$ is received by application/service router $212_{I2}$, which identifies first ISP network data server $211_{I1}$ as the sole source of the requested content item (because the first ISP network data server $211_{I1}$, and/or another device(s) responsible for monitoring the number of requests for the data item, has not yet decided that it is appropriate to promote storage of the content item) and, thus, propagates the content item request to first ISP network data server $211_{I1}$. At step 242, first ISP network data server $211_{I1}$ responds to the request for the content item from user terminal $220_{B3}$ by retrieving a copy of the requested content item from its local memory and propagating the content item to user terminal $220_{B3}$ which requested the content item. Additionally, at step 242, using the data promotion algorithm, first ISP network data server $211_{I1}$ (and/or another device(s) responsible for monitoring the number of requests for the data item) also decides to promote the content item. The first ISP network data server $211_{I1}$ selects a data server to which the content item should be promoted. In this example, first ISP network data server $211_{I1}$ selects the backbone network data server $211_B$ as the data server to which the content item should be promoted (e.g., based on the increasing number of requests for the content item that are being received from multiple different ISP networks). The first ISP network data server $211_{I1}$ then sends a copy of the content item to backbone network data server $211_B$, which stores the content item. The first ISP network data server $211_{I1}$ then notifies one or more (or, in some cases, all) of the application/service routers which are capable of serving requests for the content item that the content item is now available from backbone network data server $211_B$. For example, in an embodiment in which all of the other application/service routers which are capable of serving requests for the content item are to be notified of the promotion of the data item, the first ISP network data server $211_{I1}$ then notifies each of the other application/service routers $212_{I2}$, $212_{I3}$, and $212_H$ which are capable of serving requests for the content item that the content item is now available from backbone network data server $211_B$.

In this manner, the content item may be distributed to user terminals 220 in response to requests as needed, and promoted as needed in order to better serve such requests. In the example of FIG. 2, an assumption was made that a content item is only stored on one data server at a time; however, as described herein, a content item may be stored on multiple data servers. Thus, for example, in continuation of the example of FIG. 2, assuming that additional requests for the content item are received from many of the user terminals $220_C$ being served by third ISP network $210_{I3}$, backbone network data server $211_B$ may decide to promote the content item to third ISP network data server $211_{I3}$ while also retaining a copy of the content item locally. The backbone network data server $211_B$ notifies each of the application/service routers which are capable of serving requests for the content item (which, in this example, includes each of the other application/service routers $212_{I1}$, $212_{I2}$, $212_{I3}$, and $212_H$) that the content item is now available from both the backbone data server $211_B$ and third ISP network data server $211_{I3}$. As a result, for each additional request for the content item, the application/service router 212 that receives the request will perform a parameterized selection process in order to determine which data server (i.e., the backbone network data server $211_B$ or third ISP network data server $211_{I3}$) should serve the request for the content item. In the example of FIG. 2, additional requests for the content item that are received from user terminals $220_A$ and $220_B$ will most likely be served from backbone network data server $211_B$, while additional requests for the content item that are received from user terminals $220_C$ will most likely be served from third ISP network data server $211_{I3}$ (although this is not strictly necessary).

Although the example of FIG. 2 is primarily described within the context of a data promotion algorithm in which the popularity of the content item (i.e., in terms of the number of requests for the content item that are received) is used as the basis for promotion of the content item, as described herein many different parameters may be considered in determining whether a content item should be promoted from a source data server to one or more target data servers. Similarly, although the example of FIG. 2 is primarily described within the context of a data delivery algorithm in which the requested content item is only available from one data server at any given time, as described herein, where a content item is available from multiple data servers when a request for the content item is received, the application/service router that receives the request may consider many different parameters in selecting which of the data servers is to serve the request for the content item.

As may be seen from the example of FIG. 2, the parameterized data distribution functions depicted and described herein provide localization of network traffic required for distribution of data to end users. For example, assuming that the content item generated at user terminal $220_{A1}$ was initially stored on backbone network data server $211_B$ (for example, as in existing systems where user-generated content items are stored on a centralized server, e.g., on a centralized YouTube server), rather than in local memory of user terminal $220_{A1}$, each of the requests for the content item would have had to have been directed to backbone network data server $211_B$ and each of the resulting responses including the content item would have had to have been provided from backbone network data server $211_B$. The operation of data distribution network 200 in this manner would have resulted in a significant increase in the amount of network resources consumed, as compared with the operation of data distribution network 200 according to the example of FIG. 2 in which the parameterized data distribution functions depicted and described herein provide localization of network traffic required for distribution of data to end users.

For example, the request for the content item initiated by user terminal $220_{A6}$ would have been directed to the backbone network data server $211_B$, rather than to the ISP network data server $211_{I1}$, thereby causing additional consumption of resources within ISP network $210_{I1}$, on the link between ISP network $210_{I1}$ and backbone network $210_B$, and within backbone network $210_B$. By contrast, using parameterized data distribution functions depicted and described herein, the request for the content item initiated by user terminal $220_{A6}$ in the example of FIG. 2 was ISP network data server $211_{I1}$, thereby resulting of localization of data distribution traffic within ISP network $210_{I1}$ (and, thus, conserving valuable network resources between ISP network $210_{I1}$ and backbone network $210_B$, and within backbone network $210_B$).

Figure 3:
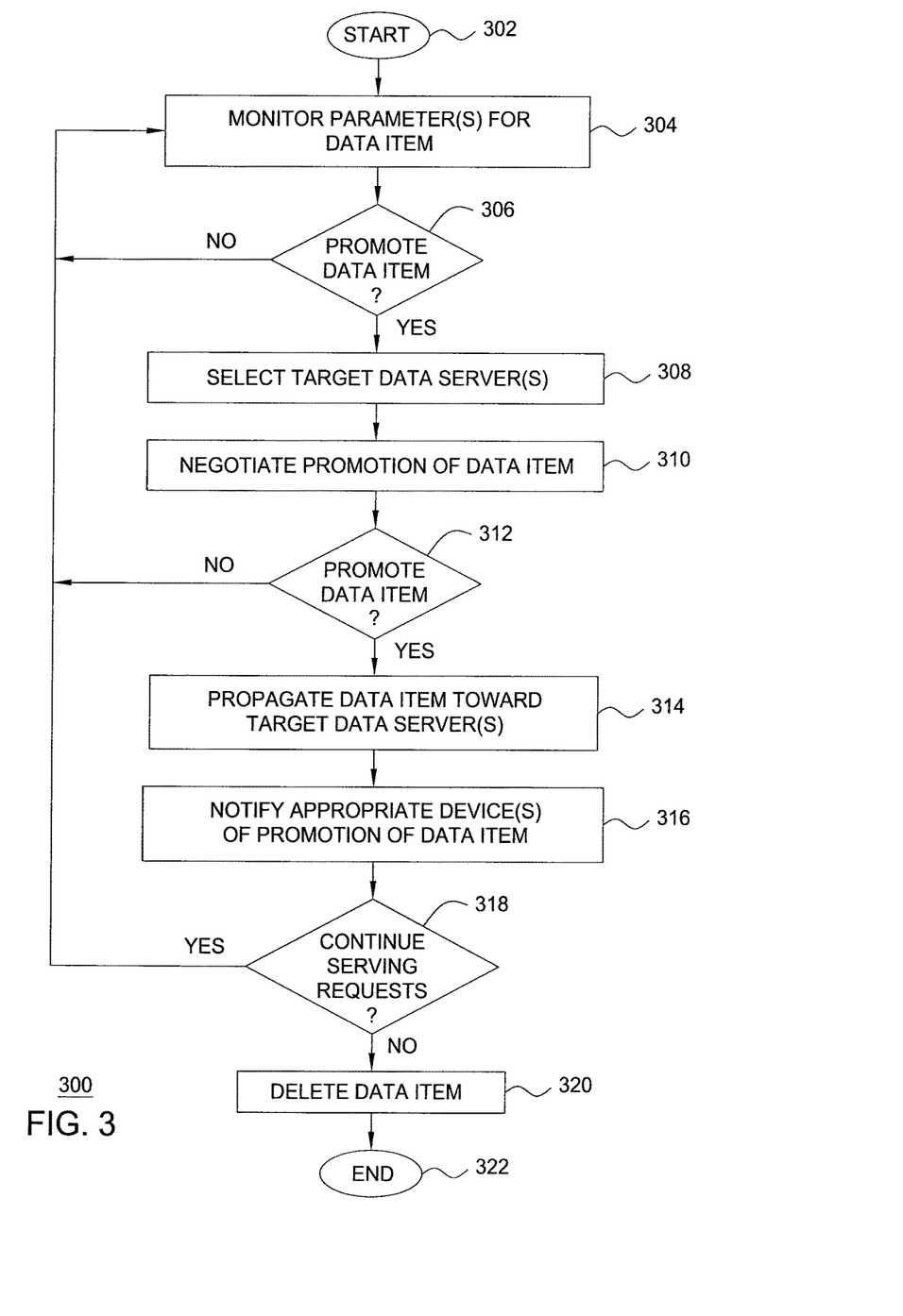
FIG. 3 depicts a method according to one embodiment of promoting a data item from a source data server to one or more target data servers.
Figure 4:
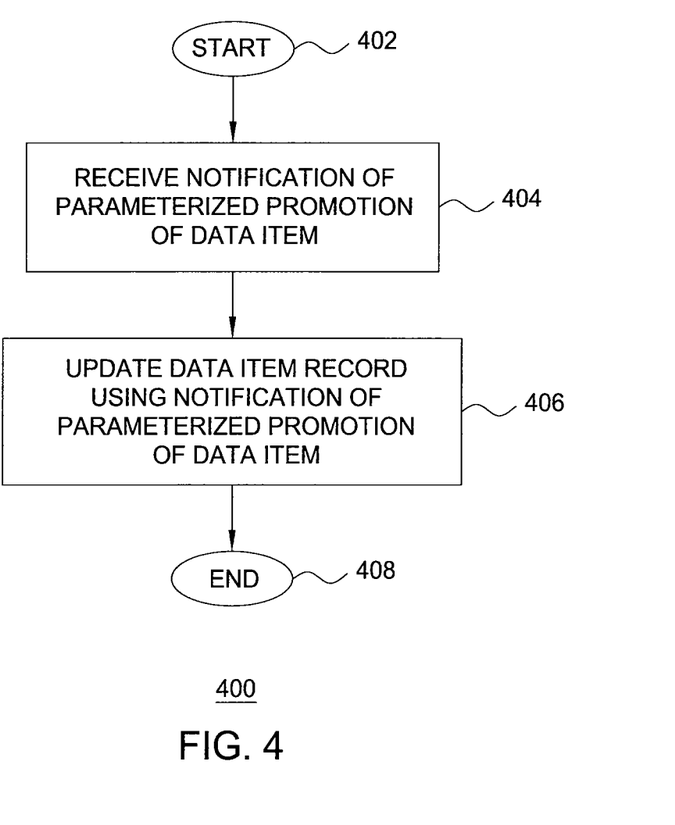
FIG. 4 depicts a method according to one embodiment of updating an application/service router to reflect parameterized promotion of a data item from a source data server to one or more target data servers.
Figure 5:
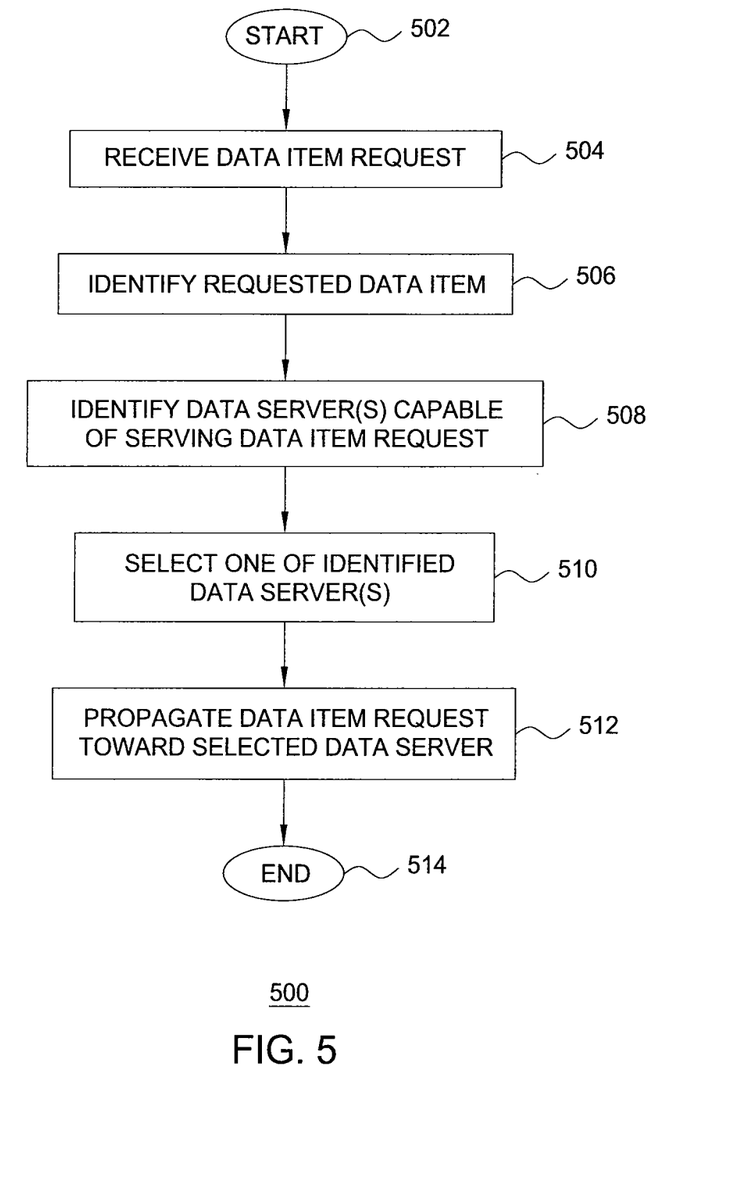
FIG. 5 depicts a method according to one embodiment of processing a data item request at an application/service router.

A more generalized description of the parameterized data promotion functions and parameterized data delivery functions of the present invention is provided herein with respect to FIG. 3, FIG. 4, and FIG. 5.

FIG. 3 depicts a method according to one embodiment of the present invention. Specifically, method 300 of FIG. 3 includes a method for promoting a data item from a source data server to one or more target data servers. Although depicted and described herein as being performed serially, at least a portion of the steps of method 300 may be performed contemporaneously, or in a different order than depicted and described with respect to FIG. 3. The method 300 begins at step 302 and proceeds to step 304.

At step 304, one or more parameters are monitored for the data item. The monitoring may be performed by any device or combination of devices (e.g., one or more of user terminals, network data servers, application/service routers, other network elements, and the like, as well as various combinations thereof).

At step 306, based on the monitoring of the one or more parameters, a determination is made as to whether to promote the data item to one or more target servers. If a determination is made that the data item should not be promoted, the method 300 returns to step 304 (i.e., the parameter(s) for the data item continue to be monitored for an indication that the data item should be promoted). If a determination is made that the data item should be promoted, the method 300 proceeds to step 308.

At step 308, at least one target data server to which the data item should be promoted is selected. The selection of a target data server(s) to which the data item should be promoted may be based on the monitoring of the parameter(s) and/or using other information. The selection of a target data server(s) may be performed by any device or combination of devices.

At step 310, negotiation is performed to determine whether or not the selected target data server(s) will accept the data item. The negotiations may be performed using any information. The negotiation may be performed between any combination of devices. In one embodiment, negotiation may be optional (e.g., where target data servers are not adapted to be able to refuse acceptance of a data item promoted from a source data server).

At step 312, a determination is made as to whether or not the target data server(s) will accept the data item from the source data server. The determination as to whether or not the target data server(s) will accept the data item from the source data server is the result of the negotiation that is performed (and, thus, may be made by any device or combination of devices involved in the negotiation). If the target data server(s) will not accept the data item from the source data server, method 300 returns to step 304 (i.e., the data item will continue to be stored by the source data server and served by the source data server). If the target data server(s) will accept the data item from the source data server, method 300 proceeds to step 314.

At step 314, the source data server propagates the data item to the selected target data server(s) such that the target data server(s) may serve future requests for the data item. The source data server may propagate the data item to the selected target data server(s) in any manner.

At step 316, the source data server notifies the appropriate device(s) of the promotion of the data item from the source data server to the target data server (e.g., application/service routers associated with the application or service of the data item and/or other types of devices where such devices may require the information, such as where other devices participate in parameterized promotion and/or delivery of data items). The source data server may notify the appropriate device(s) by identifying the appropriate device(s) and forwarding a status update message to the appropriate device(s). Although primarily described with respect to an embodiment in which the source data server notifies the appropriate devices(s) of the promotion of the data item, in other embodiments one or more of the target data server(s) could notify the appropriate device(s) of the promotion of the data item.

At step 318, a determination is made as to whether the source data server will continue serving requests for the data item. If the source data server will continue serving requests for the data item, method 300 returns to step 304, such that monitoring of the parameter(s) for the data item for the source data server continues. If the source data server will not continue to serve requests for the data item, method 300 proceeds to step 320.

At step 320, the source data server deletes the data item from local memory because the source data server will no longer serve requests for the data item.

At step 322, method 300 ends (although a similar process is performed for the data item on the one or more target data servers now responsible for serving requests for the data item).

FIG. 4 depicts a method according to one embodiment of the present invention. Specifically, method 400 of FIG. 4 includes a method for updating an application/service router to reflect parameterized promotion of a data item from a source data server to one or more target data servers. Although depicted and described herein as being performed serially, at least a portion of the steps of method 400 may be performed contemporaneously, or in a different order than depicted and described with respect to FIG. 4. The method 400 begins at step 402 and proceeds to step 404.

At step 404, a notification of parameterized promotion of a data item is received. The notification of parameterized promotion of a data item is received at an application/service router. The notification of parameterized promotion of a data item originates from one or more of the source data server, the target data server(s), or any other network element capable of providing such a notification. The notification of parameterized promotion of a data item may include any information associated with the parameterized promotion of a data item.

At step 406, a data item record stored on the application/service router is updated based on notification of parameterized promotion of the data item. The data item record is updated to reflect the data servers currently capable of serving the data item (e.g., any data server that is currently storing a copy of that data item). For example, the list of data servers currently capable of serving the data item includes the target data server(s) to which the data item was promoted, the source data server (where the source data server retains a copy of the data item, rather than deleting it), and any other data servers that may also be storing a copy of the data item.

At step 408, method 400 ends.

FIG. 5 depicts a method according to one embodiment of the present invention. Specifically, method 500 of FIG. 5 includes a method for processing a data item request at an application/service router. Although depicted and described herein as being performed serially, at least a portion of the steps of method 500 may be performed contemporaneously, or in a different order than depicted and described with respect to FIG. 5. The method 500 begins at step 502 and proceeds to step 504.

At step 504, a request for a data item is received at a router that is capable of forwarding the data item request to a data server that is capable of serving the data item request (e.g., at an application/service router supporting requests for data items associated with an application or service supported by that application/service router). The data item request originates from a user terminal (e.g., where a user requests a data item).

At step 506, the router identifies the data item being requested. The router may identify the data item being requested using a data item identifier specified in the data item request. At step 508, the router identifies one or more data servers capable of serving the data item request. The router may identify the data servers that are capable of serving the request by retrieving a data item record stored at the router. The router may locate and retrieve the data item record for the data item using the data item identifier.

At step 510, the router selects one of the identified data servers that will serve the data item request. The router may select the data server that will serve the data item request in many ways. In one embodiment, the router may select the data server that will serve the data item request by analyzing one or more parameters for the data item request (e.g., one or more characteristics of the data item request, one or more characteristics of the network, one or more characteristics of each of the data servers capable of serving the data item request, and the like, as well as various combinations thereof).

At step 512, the router propagates the data item request toward the selected data server.

At step 514, method 500 ends.

In one embodiment, in order for the data promotion algorithms of the present invention to function properly, each of the data servers running the data promotion algorithms of the present invention must have information about each of the other data servers running the data promotion algorithms of the present invention (in order to be able to select the other data server(s) to which data items should be promoted) and, further, must have information about each of the application/service routers capable of serving the data items (in order to update the application/service routers as data items are promoted between data servers).

In one embodiment, a data server information publication mechanism may be supported, such that each data server running the data promotion algorithm may publish its location/capabilities to all of the other data servers running the data distribution algorithm, thereby enabling each data server to make an informed decision regarding promotion of data items to other data servers. Similarly, in one embodiment, a router information publication mechanism may be supported, such that each application/service router running the data promotion algorithm may publish its location/capabilities to all of the data servers running the data distribution algorithm, thereby enabling each data server to notify the appropriate application/service routers when data items are promoted to other data servers.

Although primarily depicted and described herein with respect to embodiments in which the parameterized data promotion decision for a given data item is performed by one device (e.g., by a data server that currently stores that data item), in other embodiments the parameterized data promotion decision for a given data item may be performed as a cooperative function across multiple devices (e.g., by one or more data servers, one or more application/service routers, one or more other devices, and the like, as well as various combinations thereof). Similarly, although primarily depicted and described herein with respect to embodiments in which other parameterized data promotion functions are performed by a specific device or devices, any parameterized data promotion functions may be performed by any device or combination of devices which have, or may otherwise obtain, information required to perform such functions.

Although primarily depicted and described herein with respect to embodiments in which one application/service router processes a data item request using the parameterized data delivery processing functions described herein, in other embodiments a data item request may be processed as a cooperative function across multiple application/service routers (e.g., where one application/service router may forward a data item request to one or more other application/service routers deemed to be better suited to process the data item request). Similarly, although primarily depicted and described herein with respect to embodiments in which parameterized data delivery processing functions are performed by a specific device or devices, any parameterized data delivery processing functions may be performed by any device or combination of devices which have, or may otherwise obtain, information required to perform such functions.

The parameterized data distribution functions of the present invention may be performed in a cooperative manner in various other ways (e.g., using any other numbers and/or combinations of data servers, application/service routers, and/or other devices).

Although primarily depicted and described herein with respect to embodiments in which the data distribution algorithms of the present invention are implemented by the network elements on which the data is stored (i.e., on the data servers/user terminal), in other embodiments the data distribution algorithms of the present invention may be implemented on other network elements (e.g., on network monitoring devices, on routers, and the like, as well as various combinations thereof). In such embodiments, implementation of the data distribution algorithms on other network elements may be used in place of implementation on the network elements on which the data is stored or may be used in combination with implementation on the network elements on which the data is stored.

Figure 6:
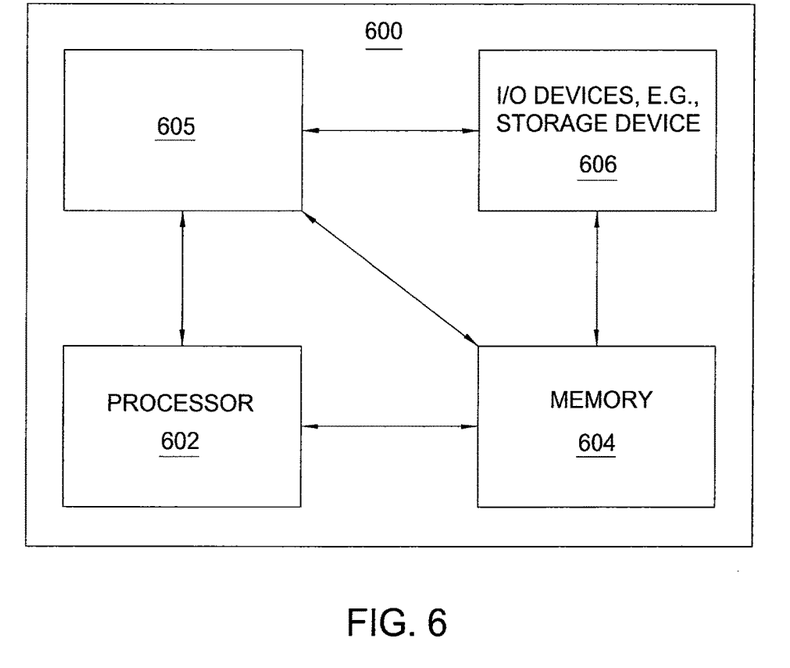
FIG. 6 depicts a high-level block diagram of a general-purpose computer suitable for use in performing the functions described herein.

FIG. 6 depicts a high-level block diagram of a general-purpose computer suitable for use in performing the functions described herein. As depicted in FIG. 6, system 600 comprises a processor element 602 (e.g., a CPU), a memory 604, e.g., random access memory (RAM) and/or read only memory (ROM), a parameterized content distribution module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the parameterized content distribution process 605 can be loaded into memory 604 and executed by processor 602 to implement the functions as discussed above. As such, parameterized content distribution process 605 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus for promoting a data item within a data distribution network, comprising:
   a processor configured to:
   monitor at least one parameter for the data item, wherein the data item is stored on a first data server of the data distribution network, wherein the at least one parameter comprises a number of requests for the data item; and
   when a determination is made, based on monitoring of the at least one parameter, that an increase in the number of requests for the data item causes an associated threshold to be satisfied, initiate a process for promoting the data item from being stored on the first data server to being stored on a second data server of the data distribution network, wherein promotion of the data item is in a direction from an edge region of the data distribution network toward a core region of the data distribution network.

2. The apparatus of claim 1, wherein the processor is configured to monitor the at least one parameter for the data item by:
   receiving a plurality of requests for the data item; and
   monitoring at least one characteristic of each of the received requests for the data item.

3. The apparatus of claim 1, wherein the at least one parameter further comprises at least one of a characteristic of the first data server, a characteristic of the second data server, a characteristic of at least one network, geographic locations of requests for the data item, network locations of requests for the data item, and network path properties associated with network paths to requestors of the data item.

4. The apparatus of claim 1, wherein one of:
   the first data server is a user terminal and the second data server is a network data server; and
   the first data server is a first network data server and the second data server is a second network data server.

5. The apparatus of claim 1, wherein the data item comprises a user-generated content item.

6. The apparatus of claim 1, wherein the processor is configured to monitor the at least one parameter at the first data server, wherein the processor is configured to initiate the process for promoting the data item from being stored on the first data server to being stored on a second data server by:
   initiating propagation of the data item from the first data server toward the second data server.

7. The apparatus of claim 1, wherein the processor is configured to initiate the process for promoting the data item from being stored on the first data server to being stored on a second data server by:
   propagating, toward the first data server, a message indicative that the data item is to be promoted from the first data server toward the second data server.

8. The apparatus of claim 1, wherein the processor is configured to:
   propagate, toward at least one network device, a message indicative of the promotion of the data item from the first data server toward the second data server, the message for configuring the at least one network device to identify the second data server as a source of the data item capable of serving future requests for the data item.

9. An apparatus for promoting a data item within a data distribution network, comprising:
   a processor configured to:
   store the data item at a user device, wherein the user device is the data ingestion point into the data distribution network for the data item; and
   when a determination is made, based on monitoring of at least one parameter for the data item, to promote the data item within the data distribution network, initiate a process for promoting the data item from being stored on the user device to being stored on a data server of the data distribution network.

10. The apparatus of claim 9, wherein the data item is a user-generated content item.

11. The apparatus of claim 9, wherein the processor is configured to monitor the at least one parameter for the data item.

12. The apparatus of claim 9, wherein the processor is configured to initiate a process for promoting the data item from being stored on the user device to being stored on the data server of the data distribution network in response to receiving a message from a network element configured to monitor of the at least one parameter for the data item.

13. The apparatus of claim 9, wherein the at least one parameter comprises at least one of a characteristic of the user device, a characteristic of the data server, a characteristic of at least one network, a number of requests for the data item, geographic locations of requests for the data item, network locations of requests for the data item, and network path properties associated with network paths to requestors of the data item.

14. The apparatus of claim 9, wherein the processor is configured to respond to requests for the data item.

15. The apparatus of claim 9, wherein the processor is configured to propagate the data item from the user device toward the data server.

16. An apparatus for promoting a data item within a data distribution network, comprising:
   a processor configured to:
   store the data item at a first data server of the data distribution network, wherein the data item enters the data distribution network via a user device; and
   when a determination is made, based on monitoring of at least one parameter for the data item, to promote the data item within the data distribution network, initiate a process for promoting the data item from being stored on the first data server to being stored on a second data server of the data distribution network, wherein promotion of the data item is in a direction from an edge region of the data distribution network toward a core region of the data distribution network.

17. The apparatus of claim 16, wherein the processor is configured to monitor the at least one parameter for the data item.

18. The apparatus of claim 16, wherein the first data server is a user device and the second data server is a network data server.

19. The apparatus of claim 16, wherein the first data server is a first network data server and the second data server is a second network data server.

20. The apparatus of claim 18, wherein the first network data server is associated with an Internet Service Provider (ISP) network, wherein the second network data server is associated with a service provider backbone network.

* * * * *